United States Patent [19]

Yagi et al.

[11] Patent Number: 5,258,424
[45] Date of Patent: Nov. 2, 1993

[54] AQUEOUS COATING COMPOSITION CAPABLE OF FORMING A COATING WITH IMPROVED MOISTURE PERMEABILITY

[75] Inventors: Touru Yagi, Osaka; Koichi Saito, Kyoto, both of Japan

[73] Assignee: Nippon Paint Co., Ltd., Osaka, Japan

[21] Appl. No.: 899,950

[22] Filed: Jun. 17, 1992

Related U.S. Application Data

[63] Continuation of Ser. No. 648,317, Jan. 29, 1991, abandoned, which is a continuation of Ser. No. 366,419, Jun. 15, 1989, abandoned.

[30] Foreign Application Priority Data

Jun. 15, 1988 [JP] Japan ................... 63-147107

[51] Int. Cl.$^5$ ............................................. C08L 33/02
[52] U.S. Cl. ..................... 523/221; 523/220; 524/501
[58] Field of Search ............... 523/220, 221; 524/493, 524/502, 501

[56] References Cited

U.S. PATENT DOCUMENTS

| | | | |
|---|---|---|---|
| 4,069,186 | 1/1978 | Ramig | 523/221 |
| 4,247,438 | 1/1981 | Eck et al. | 523/221 |
| 4,277,385 | 7/1981 | Carroll et al. | 523/221 |
| 4,384,056 | 5/1983 | Schmidt et al. | 523/221 |
| 4,395,500 | 7/1983 | Löhr et al. | 523/221 |
| 4,526,910 | 7/1985 | Das et al. | 523/220 |
| 4,567,099 | 1/1986 | Van Gilder et al. | 523/221 |
| 4,624,973 | 11/1986 | Kuwajima et al. | 523/221 |
| 4,749,616 | 6/1988 | Liu et al. | 524/493 |

OTHER PUBLICATIONS

Sax et al., *Hawley's Condensed Chemical Dictionary*, Van Nostrand Reinhold, New York, 1987, p. 774.

*Primary Examiner*—Joseph L. Schofer
*Assistant Examiner*—R. H. Delmendo
*Attorney, Agent, or Firm*—Wenderoth, Lind & Ponack

[57] ABSTRACT

An aqueous coating composition comprising
(A) an acrylic resin emulsion having an average particle diameter of 0.05 to 5, and
(B) hydrophilic microparticles having an average diameter of 0.01 to 3, the solid weight ratio of said (A)/(B) being 99/1 to 50/50. The coating composition is excellent in storage stability and capable of forming a coating with excellent moisture permeability, water resistance, flexibility, durability and other desired film properties.

4 Claims, No Drawings

AQUEOUS COATING COMPOSITION CAPABLE OF FORMING A COATING WITH IMPROVED MOISTURE PERMEABILITY

This is a continuation of application Ser. No. 648,317, filed Jan. 29, 1991, which is a continuation of 07/366,419, filed Jun. 15, 1989, both now abandoned.

FIELD OF THE INVENTION

The present invention relates to an aqueous coating composition capable of forming a coating with improved moisture permeability and more specifically, it concerns an aqueous coating composition comprising as resinous vehicle an acrylic resin emulsion and hydrophilic microparticles, which is excellent in storage stability and capable of forming a coating with excellent moisture permeability, water resistance and flexibility, as well as other general film properties as durability and the like.

BACKGROUND OF THE INVENTION

Recently, increasing social demands are directed to the protection of concrete structures and maintenance of the beauty thereof.

One of the weak points possessed by the contrete structures is believed to be the easy occurrence of cracks from various sources. To cope with the same, a number of elastic paints are placed on the market. However, most of elastic paints paints are based on a material having a low Tg value of less than room temperature and formulated into a low pigment-volume-concentration (PVC) and therefore indeed they are useful in giving coatings with excellent gloss and flexible properties which may well accommodate to the underlying cracks, but there are such problems that the coatings are generally deficient in moisture permeabilities and when applied with a top coat, there often result undesired blisters in the top coat and even peeling of the coat from the moisture condensation within the concrete.

In another technique of using sand textured coatings (Synthetic Resin Emulsion Type) (JISA-6909), since the material is formulated into more than the critical pigment volume concentration (CPVC), the resulting coating has innumerable fine voids and hence is excellent in moisture permeability and however, it is deficient in flexibility and cannot accommodate to the underlying cracks. Moreover, the waterproof properties of the coating against rain water is quite poor and thus, the coating cannot give enough protection for the concrete structures.

It is, therefore, an object of the invention to provide an aqueous coating composition capable of producing a coating with excellent gloss, flexibility and elongation which can well accommodate to the underlying cracks, as well as exhibiting improved moisture permeability and water resistance.

SUMMARY OF THE INVENTION

According to the invention, the abovementioned and other objects of the invention may be advantageously attained with an aqueous coating composition comprising (A) an acrylic resin emulsion having an average particle diameter of 0.05 to 5 $8\mu$ and (B) hydrophilic microparticles having an average diameter of 0.01 to $3\mu$, the solid weight ratio of said (A)/(B) being 99/1 to 50/50. More preferably, the present invention relates to an aqueous coating composition comprising (A) an acrylic resin emulsion having an average particle diameter of 0.05 to $5\mu$ and (B) hydrophilic microparticles having an average diameter of 0.01 to $3\mu$ selected from non-film-forming acrylic resin microparticles containing as a part of the constituent monomers, 0.05 m mol/g or more of hydrophilic monomers and water dispersible colloidal silica, the solid weight ratio of said (A)/(B) being 99/1 to 50/50 and pigment volume concentration (PVC) being 50% or less. The latter composition can produce a coating having a film elongation of 100% or more and a film moisture permeability of 100 $g/m^2$ 24 hrs or more.

The water dispersible resin emulsion used in the invention is an acrylic resin emulsion having an average particle diameter of 0.05 to $5\mu$ which may be advantageously prepared by an emulsion polymerization or artificial emulsification of $\alpha,\beta$-ethylenically unsaturated monomers.

As the $\alpha,\beta$-ethylenically unsaturated monomers, any of the compounds having in its molecule one or more polymerizable ethylenically unsaturated bondings customarily used in the preparation of acrylic resin for coating use may be satisfactorily used. They are classified in the following groups:

(1) alkyl acrylates or methacrylates as, for example, methyl acrylate, methyl methacrylate, ethyl acrylate, ethyl methacrylate, n-butyl acrylate, n-butyl methacrylate, 2-ethylhexyl acrylate and the like;
(2) polymerizable aromatic compounds as, for example, styrene, $\alpha$-methyl styrene, vinyl toluene, t-butyl styrene and the like;
(3) vinyl compounds as, for example, vinyl acetate, vinyl propionate, vinyl chloride, vinylidene chloride and the like;
(4) $\alpha$-olefins as, for example, ethylene, propylene and the like;
(5) diene compounds as, for example, butadiene, isoprene and the like;
(6) carboxyl group containing monomers as, for example, acrylic acid, methacrylic acid, crotonic acid, itaconic acid, maleic acid, fumaric acid and the like;
(7) hydroxyl group containing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like;
(8) polymerizable nitriles as, for example, acrylonitrile, methacrylonitrile and the like;
(9) nitrogen containing alkyl acrylates and methacrylates as, for example, dimethylaminoethyl acrylate, dimethylaminoethyl methacrylate and the like;
(10) polymerizable amides as, for example, acryl amide, methacryl amide and the like.

The present acrylic resin emulsion must be of film-forming nature, i.e. must form a film when applied and dried or baked at an elevated temperature. To assist said film forming, various auxiliaries as a solvent, plasticizer and the like may be used as desired. The abovementioned acrylic resin may be crosslinked to a certain extent not to cause the complete loss of the film-forming properties thereof. Such crosslinking may be advantageously obtained by using as a part of the polymerizable monomers, the so-called crosslinking monomer having in its molecule at least two ethylenically unsaturated bonds.

Examples of such crosslinking monomers are polymerizable unsaturated monocarboxylic esters of polyhydric alcohol, polymerizable unsaturated alcohol esters of polybasic acid and aromatic compounds having 2 or more vinyl groups. More specifically, they may be ethylene glycol diacrylate, ethylene glycol dimethacrylate, triethylene glycol dimethacrylate, tetraethyleneglycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethyl ethane diacrylate, 1,1,1-trishydroxymethyl ethane triacrylate, 1,1,1-trishydroxymethyl ethane dimethacrylate, 1,1,1-trishydroxymethyl ethane trimethacrylate, 1,1,1-trishydroxymethyl propane diacrylate, 1,1,1-trishydroxymethyl propane triacrylate, 1,1,1-trishydroxymethyl propane dimethacrylate, 1,1,1-trishydroxymethyl propane trimethacrylate, triallyl cyanurate, triallyl isocyanurate, triallyl trimellitate diallylterephthalate, divinylbenzene and the like.

Alternatively, the desired crosslinking may likewise be obtained, without relying on such crosslinking monomers by using such monomer and having only one ethylenically unsaturated bond, proving having in its same molecule, the following, mutually reactive, two functional groups: epoxy and carboxyl groups; amine and carboxyl groups; epoxy and acid anhydride groups, amine and acid anhydride groups; alkylene imine and carbonyl groups; organoalkoxysilane and carboxyl groups; hydroxy and isocyanate groups and the like. In place of using such monomer, one may use the combination of two monomers, one being a mono-unsaturated polymerizable monomer having one of the abovementioned two functional groups and the other being a mono-unsaturated polymerizable monomer having the other of the abovementioned two functional groups.

The present water dispersible acrylic resin emulsion must have an average particle diameter of 0.05 to 5μ, preferably 0.1 to 3μ. This is because if the average particle diameter is less than 0.05μ, a larger amount of surfactant is required for the stabilization of emulsion which is not desired because the resulting coating would have increased water absorption power and hence inferior water resistance. When the average particle diameter exceeds the upper limit of 5μ, it is not possible to obtain a uniform coating and the resulted coating is unsuitable as a top coat for concrete structures in respect to gloss and durability. In this specification, the particle diameter of the emulsion resin is such as to have an average particle diameter determined by using a quasielastic light scattering method (Coulter Model N4). As to the molecular weight of the said acrylic resin, there is no particular limit on it and any acrylic resins used in a coating composition may satisfactorily be used and however, it is generally recognized that a fully satisfiable durability and elongation can hardly be obtained with a resin having a number average molecular weight of less than 10,000 and therefore, it should preferably be 10,000 or more.

In this invention, the abovementioned water dispersible acrylic resin emulsion is combined with hydrophilic microparticles having an average diameter of 0.01 to 3μ. The average diameter of said microparticles shall denote a mean value of particle diameters determined by using a quasielastic light scattering method (Coulter Model N4). Such microparticles may be of either organic or inorganic nature. As organic microparticles, any of resinous microparticles prepared by an emulsion polymerization, NAD (non-aquarius-dispersion) method or resin pulverization method may be satisfactorily used. As inorganic microparticles, use is made of colloidal silica and the like hereinafter stated. In either type of microparticles, they must keep their original particle forms even under the temperature conditions to which the present coating composition is exposed. Therefore, in the case of organic microparticles, the constituent resin should preferably be crosslinked, or should have a crystal structure or a higher Tg value (more than the use temperature). Such microparticles must have an average diameter of 0.01 to 3μ, preferably 0.03 to 1μ, and must be of hydrophilic nature to the extent sufficient to be uniformly and stably dispersed in an acrylic resin emulsion. If the average diameter of said microparticles is less than 0.01μ, the surface area of these microparticles become too large, resulting in an undue failure in the particle stability itself.

If the average diameter exceeds the limit of 3μ, the surface area of these microparticles will become too small, resulting the shortage of amount of hydrophilic functional groups in the system and hence the objects of the present invention cannot be allowed.

From the standpoint of preparation easiness, most preferable organic microparticles are acrylic resin microparticles obtained by an emulsion polymerization technique. At that time, by the adoption, as a part of α, β -ethylenically unsaturated monomers, of such hydrophilic monomer as (1) carboxyl group containing monomer (e.g. acrylic acid, methacrylic acid, maleic acid, crotonic acid, itaconic acid, fumaric acid and their alkali metal salts, ammonium salts and the like), (2) nitrogen containing alkyl acrylates or methacrylates (e.g. dimethylaminoethyl acrylate, dimethylaminoethyl methacrylate and the like), (3) phosphor containing alkyl acrylates or methacrylates (e.g. methacryloxyethyl phosphate, bis-methacryloxyethyl phosphate, methacryloxyethylphenyl acid phosphate and the like)

(4) polyoxyethylene group containing macromer represented by the formula:

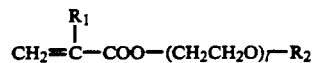

(in which $R_1$ is hydrogen or methyl group; $R_2$ is lower alkyl or phenyl group; l is an integer of 1 to 50) and (5) an end hydrophilic group containing macromers disclosed in Japanese Patent Publications (unexamined) 161742/87 and 11534/87, said macromers represented by said formula:

in which $R_1$ is a hydrogen or methyl group; $R_3$ is a substituted or unsubstituted aliphatic hydrocarbon having 2 to 10 carbon atoms, an alicyclic hydrocarbon having 6 to 7 carbon atoms or an aromatic hydrocarbon having 6 carbon atoms; A is a repeating unit of $-R_4-O-(CO-R_5-O-)_m$ or $-(R_6-O)_o-$ in which $R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m is an integer of 1 to 10; and n is an integer of 2 to 50, and an end hydrophilic group containing macromer represented by the formula:

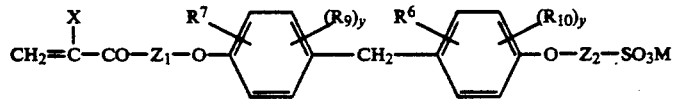

in which $R_7$ and $R_8$ are the same or different groups and each represents a hydrogen atom or an alkyl group having 1 to 25 carbon atoms; $R_9$ and $R_{10}$ are the same or different groups and each represents an alkyl group having 1 to 25 carbon atoms, a benzyl group or a styrene group; Y is O or an integer of 1 to 2; $Z^1$ and $Z^2$ are the same or different (poly)alkyleneoxy groups represented by the formula:

wherein $A^1$, $A^2$, $A^3$ ... $A^{n'}$ are the same or different groups and each represents an ethylene or a propylene group and wherein n' is not less than 1; M is an alkaline metal, an alkaline earth metal, an ammonium or an amine cation; and X is a hydrogen atom or a methyl group, and having an average diameter of 0.01 to 3 microns said hydrophilic group containing marcomer being used in an amount so as to become 0.05 m mol/g or more of the final product.

To make the resin microparticles resistive to the morphological change under use temperature conditions, it is preferable to use as a part of monomers for the preparation of at least the inner part of the resin microparticles, a monomer which is effective in producing a polymer whose glass transition point (Tg) is higher than the use temperature (including drying and baking temperatures) of the coating composition or a crosslinking monomer which is effective in producing a crosslinked resin.

As a polymerization initiator, the following may be advantageously used: organic peroxides as benzoyl peroxide, t-butyl peroxide, cumene hydroperoxide and the like; organic azo compounds as azobiscyano valeric acid, azobisisobutyronitrile, azobis (2,4-dimethyl)-valeronitrile, azobis(2-amidinopropane)hydrochloride and the like; inorganic water soluble radical initiators as potassium persulfate, ammonium persulfate, sodium persulfate, hydrogen peroxide and the like; and Redox initiators. A conventional chain transfer agent as mercaptans (e.g. ethyl mercaptan, butyl mercaptan, dodecyl mercaptan and the like), and halogenated carbons (e.g. carbon tetrabromide, carbon tetrachloride and the like) may also be used.

In preparing an acrylic resin emulsion, polymerization may be carried out in a conventional way using appropriate amounts of a surfactant, an emulsifier, a polymerization initiator, a chain transfer agent and water medium. In an ordinary emulsion polymerization, an aqueous medium is used to obtain an emulsion containing dispersed water insoluble resin microparticles. In this invention, the thus obtained emulsion may be used as it is or as a concentrate after being concentrated to some extent.

It is also possible to separate the resin microparticles from the emulsion, redispersed in an aqueous medium and use the latter. Therefore, the reaction medium is not necessarily be limited to water alone, and it is likewise possible to prepare the acrylic resin microparticles in a non-aqueous medium by the NAD method. As already stated, hydrophilic functional groups should preferably appear effectively on the whole surfaces of the resin microparticle. This can effectively be achieved by the adoption of monomers each having different hydrophilic properties in a conventional emulsion polymerization system.

However, if required, a multi-stage emulsion polymerization including seed polymerization may be advantageously used. As the inorganic microparticles, mention is made of colloidal silica prepared by the dialysis of water-glass and the like. Such inorganic microparticles bear, on the respective particle surfaces, hydroxyl groups, which will generate opposite charged ions forming an electric double layer and afford the desired hydrophilic nature of said surfaces.

The abovementioned water dispersible acrylic resin emulsion (A) and hydrophilic microparticles (B) may be combined together during the course of preparation of a coating composition. Alternatively, they may be combined together by presenting said microparticles (B) in the preparation of said resin emulsion (A). In either case, in the present coating composition, said acrylic resin emulsion (A) and said microparticles (B) must be present in a solid weight ratio of 99 to 50% of the former to 1 to 50% of the latter. This is because if the amount of water dispersible emulsion is too excessive and the amount of microparticles is less than 1% by weight, though the desired elongation and gloss of coating are maintained, it is not possible to impart the desired moisture permeability to the coating.

Whereas, if the amount of said microparticles exceeds the limit of 50% by weight, the film-forming properties of the total composition are markedly decreased, resulting in a coating with poor gloss and elongation properties. In an extreme case, many cracks are found in the formed coating. A particularly preferable compounding ratio is 90 to 60% by weight of the former to 10 to 40% by weight of the latter. It is also well recognized that the present objects may be advantageously attained by adopting the specific particle diameter ratio of said water dispersible resin emulsion (A) and said microparticles (B), i.e. 50/49 to 50/1. If the particle diameter ratio of (A)/(B) is less than 50/49, the hydrophilic surface area of the microparticles formed within a base emulsion is too small and hence the desired moisture permeability can hardly be obtained. On the other hand, if the particle diameter ratio of (A)/(B) is more than 50/1, it is indeed desirable for the obtainment of increased moisture permeability of coating, but undesired in that water resistance of coating is lowered because the activities of hydrophilic surfaces of the microparticles are excessively increased and coating gloss is likewise lowered because the stable compounding of the microparticles are prohibited. Therefore, in a preferable embodiment of the present invention, the particle diameter ratio of (A)/(B) is determined in a range of 50/49 to 50/1, and more preferably 2/1 to 10/1.

In the present coating composition, the pigment volume concentration (PVC) based on both the hydrophilic microparticles and the optional coloring pigments is preferably controlled to a level of 50% or less, thereby attaining fully satisfiable gloss and appearance of the coating. Furthermore, the thus formed coating is excellent in flexibility, adhesion, crackfollowing properties, water resistance and moisture permeability and therefore, it is quite useful for the protection and aesthetic improvement of concrete structures.

The invention shall be more fully explained in the following Examples. Unless otherwise stated, all parts and % are by weight.

Incidentally, in this invention, the pigment volume concentration PVC of the coating composition is calculated, following the teachings of Temple C. Patton, in the Fluidity of coating composition and Pigment dispersion, p. 141, 1971, published by Kyoritu Publishing Co., by the equation:

$$PVC = \left(\frac{\text{weight of } P}{s.g. \text{ of } P} + \frac{\text{weight of } MP}{s.p. \text{ of } MP}\right) \div$$

$$\left(\frac{\text{weight of } P}{s.p. \text{ of } P} + \frac{\text{weight of } MP}{s.p. \text{ of } MP} + \frac{\text{weight of } V}{s.p. \text{ of } V}\right)$$

in which P stands for conventional pigment; MP stands for microparticles; V stands for vehicle; and s.p. stands for specific gravity.

REFERENCE EXAMPLE 1

Into a reaction vessel fitted with a stirrer, a condenser, a thermometer and a nitrogen gas inlet tube, was placed 60 parts of succinic anhydride, 440 parts of 5:1 mole addition product of ε-caprolactone and 2-hydroxyethyl methacrylate, and 500 ppm (to the total charge) of hydroquinone monomethyl ether. While introducing air, the temperature was raised to 150° C. and the mixture was reacted at the same temperature for 60 minutes under stirring conditions. After completion of the reaction, unreacted materials were removed by hot filtration to obtain a product having an acid value of 70 as semisolid (25° C.) material.

Into a reaction vessel fitted with a stirrer, a condenser, a thermometer and a nitrogen gas inlet tube, was placed 298.5 parts of deionized water and heated to 80° C. under stirring. While maintaining the same temperature, a mixed solution of 1.5 parts of ammonium persulfate in 20 parts of deionized water was added. Then, at the same temperature, a first mixed solution of 30 parts of the abovementioned reaction product, 4.5 parts of dimethyl ethanolamine, 20 parts of N-(3-sulfopropyl)-N-methacryloyloxyethyl-N,N-dimethylammonium betaine and 174.8 parts of deionized water and a second mixed solution of 55 parts of methyl methacrylate, 55 parts of styrene, 40 parts of butyl acrylate and 30 parts of neopentyl glycol dimethacrylate were simultaneously and drop-wise added in 60 minutes. After completion of said addition, a mixture of 0.5 part of ammonium persulfate and 30 parts of deionized water was added and the combined mixture was stirred for 100 minutes to obtain an emulsion having a solid content of 30% and an average particle diameter of 0.042μ.

REFERENCE EXAMPLE 2

Into a reaction vessel fitted with a stirrer, a condenser, a thermometer and a nitrogen gas inlet tube, were placed 150 parts of succinic anhydride, 385 parts of 1:1 mole addition product of -caprolactone and 2-hydroxyethyl methacrylate, and 500 ppm (to the total charge) of hydroquinone monomethylether. While introducing air, the temperature was raised to 150° C. and the mixture was reacted at the same temperature for 40 minutes under stirring conditions. After completion of the reaction, the reaction mixture was allowed to cool to room temperatures to precipitate a small amount of unreacted acid anhydride, which was removed by filtration to obtain the desired reaction product having an acid value of 172 and a viscosity of 250 cp (25° C.). The reaction yield calculated from the acid value was 96%.

Into a reaction vessel fitted with a stirrer, a condenser, a thermometer and a nitrogen gas inlet tube, was placed 164 parts of deionized water and heated to 80° C. under stirring. While maintaining the same temperature, a first mixed solution of 0.3 parts of ammonium persulfate in 20 parts of deionized water was added in 90 minutes. Then, at the same temperature, a second mixed solution of 20 parts of the abovementioned reaction product, 2.44 parts of LiOH.H₂O, 120 parts of deionized water, 20 parts of 60% aqueous sodium dodecylbenznenesulfonate solution and 110 parts of styrene was simultaneously added dropwise in 90 minutes. After completion of said addition, the combined mixture was stirred for 100 minutes to obtain an emulsion having a solid content of 30% and an average particle diameter of 0.064μ.

REFERENCE EXAMPLE 3

Into a reaction vessel fitted with a stirrer, a condenser, a thermometer and a nitrogen gas inlet tube, was placed 40 parts of deionized water, and heated to 80° C. under stirring. While maintaining the same temperature, a first solution of 0.3 part of ammonium persulfate in 20 parts of deionized water was dropwise added in 130 minutes. Next, at the same temperature, a second mixed solution of 70 parts of deionized water, 20 parts of RA-1024 (polyoxyethylene group and —SO₃Na group containing macromer, molecular weight=1600, solid content 90%, manufactured by Nihon Nyuukazai Co.), 5 parts of 25% aqueous ammonium, 85 parts of styrene, 4 parts of ethylene glycol dimethacrylate and 8 parts of sodium 2-sulfoethyl methacrylate was simultaneously added dropwise in a period of 120 minutes. After completion of said addition, the combined mixture was stirred at the same temperature for 100 minutes to obtain an emulsion having a solid content of 46% and an average particle diameter of 0.5μ.

EXAMPLE 1

A coating composition was prepared by mixing 80 parts (solid 40 parts) of AcEM-1 (an acrylic emulsion prepared in a conventional way, an average particle diameter 0.5μ, a number average molecular weight 50,000, a glass transition point of 2° C., solid content 50%), 16.6 parts (solid 5 parts) of the i.e., an emulsion PE-1 obtained in Reference Example 1 (emulsion containing water dispersible crosslinked particles having an average particle diameter 0.04μ, bearing on the surface 0.16 m mol/g of carboxylamine groups and 0.3 m mol/g of zwitter groups as hydrophilic groups, and having a crosslink density of 0.54 m mol/g), 18.5 parts of a pigment paste obtained by mixing 2.4 parts of water, 15 parts of titanium white, 1 part of a dispersant and 0.1 part of a defoamer, 2 parts of Texanol (trademark of 2,2,4-trimethyl-1,3-pentanediol monoisobutyrate), 2 parts of Butyl Cellosolve and 3 parts of viscosity increasing agent.

The pigment volume concentration of the thus obtained composition was 17.7%.

The coating composition was then applied on a polypropylene sheet so as to become 1 mm met. thickness and elongation and moisture permeability of the coating were tested. The test results are shown in Table 1.

EXAMPLE 2

The same procedures as stated in Example 1 were repeated, except for substituting 80 parts of AcEM-2 (an acrylic emulsion, solid content 50%, particle diameter $0.3\mu$, number average molecular weight 70,000, Tg 0° C.) for 80 parts of AcEM-1 and 33 parts (solid 10 parts) of the emulsion PE-2 obtained in Reference Example 2 (i.e., an emulsion containing water dispersible crosslinked particles having an average particle diameter $0.06\mu$, bearing on the surface 0.4 m mol/g of carboxyl lithium groups and 0.24 m mol/g of surfactant as hydrophilic groups, the main chain being composed of styrene and the particles being capable of maintaining the original particle form at the temperature range encountered in the use of a common air drying paint) for 16.6 parts of PE-1. Thus obtained coating composition (PVC=25.3%) was applied on a polypropylene sheet and tested as in Example 1. The test results are shown in Table 1.

EXAMPLE 3

The same procedures as stated in Example 1 were repeated, except for substituting 80 parts of AcEM-3 (an acrylic emulsion, solid content 50%, particle diameter $0.2\mu$, number average molecular weight 90,000, Tg $-2°$ C.) for 80 parts of AcEM-1 and 23.3 parts (solid 7 parts) of water dispersible colloidal silica having an average particle diameter of $0.03\mu$, bearing on the surface anionic SiO groups and having Na as opposite charged ion in a weight ratio of $NaO/SiO_2=0.5/30$) for 16.6 parts of PE-1. The thus obtained coating composition (PVC=13.7%) was applied on a polypropylene sheet and tested as in Example 1. The test results are shown in Table 1.

EXAMPLE 4

The same procedures as stated in Example 1 were repeated, except for substituting 80 parts of AcEM-4 (acrylic emulsion, solid content 50%, particle diameter $2\mu$, number average molecular weight 80,000, Tg 1° C.) for 80 parts of AcEM-1 and 16.7 parts (solid 5 parts) of the emulsion PE-2 obtained in Reference Example 2 (i.e., an emulsion containing water dispersible crosslinked particles having an average particle diameter $0.06\mu$, bearing on the surface 0.4 m mol/g of carboxyl lithium groups and 0.24 m mol/g of surfactant as hydrophilic groups, the main chain being composed of styrene and the particles being capable of maintaining the original particle form at the temperature range encountered in the use of a common air drying paint) for 16.6 parts of PE-1. The thus obtained coating composition (PVC=17.7%) was applied on a polypropylene sheet and tested as in Example 1. The test results are shown in Table 1.

EXAMPLE 5

The same procedures as stated in Example 1 were repeated, except for substituting 80 parts of AcEM-5 (an acrylic emulsion, solid content 50%, particle diameter $0.5\mu$, number average molecular weight 50,000, Tg 2° C.) for 80 parts of AcEM-1 and 66.7 parts (solid 20 parts) of the emulsion PE-1 obtained in Reference Example 1 (an emulsion containing water dispersible crosslinked particles having an average particle diameter $0.04\mu$, bearing on the surface 0.16 m mol/g of carboxylamine groups and 0.3 m mol/g of zwitter groups as hydrophilic groups, and having a crosslink density of 0.54 m mol/g) for 16.6 parts of PE-1. The thus obtained coating composition (PVC=37.1%) was applied on a polypropylene sheet and tested as in Example 1. The test results are shown in Table 1.

EXAMPLE 6

The same procedures as stated in Example 1 were repeated, except for substituting 70 parts of AcEM-6 (an acrylic emulsion, solid content 50%, particle diameter $0.1\mu$, number average molecular weight 90,000, Tg 3° C.) for 80 parts of AcEM-1 and 66 parts (solid 20 parts) of the emulsion PE-2 obtained in Reference Example 2 for 16.6 parts of PE-1. The thus obtained coating composition (PVC=40%) was applied on a polypropylene sheet and tested as in Example 1. The test results are shown in Table 1.

EXAMPLE 7

The same procedures as stated in Example 1 were repeated, except for substituting 80 parts of AcEM-4 (acrylic emulsion, solid content 50%, particle diameter $2\mu$, number average molecular weight 80,000, Tg 1° C.) for 80 parts of AcEM-1 and 10.9 parts (solid 5 parts) of the emulsion PE-3 obtained in Reference Example 3 (an emulsion containing water dispersible crosslinked particles having an average particle diameter $0.15\mu$, bearing on the surface 0.098 m mol/g of polyoxyethylene groups and 0.098 m mol/g of sulfonium groups both derived from RA-1024 and 0.3 m mol/g of sulfonium groups derived from sodium 2-sulfoethyl methacrylate as hydrophilic groups (the total hydrophilic functional groups 0.398 m mol/g), the main chain being composed of crosslinked polystyrene) for 16.6 parts of PE-1. The thus obtained coating composition (PVC=17.7%) was applied on a polypropylene sheet and tested as in Example 1. The test results are shown in Table 1.

Evaluation

Moisture permeability test (M.V.P.):

This test was carried out by following ASTM-E-96-66 (B).

The coating compositions obtained in Examples 1 to 7 each was applied on a polypropylene sheet in 1 mm met film thickness, and air dried while keeping it in a room maintained at 20° C. and 60% relative humidity for 1 week. Thereafter, the formed film was peeled off and used as a test film.

Into a test cup (JIS-Z-0208), a quantity of water was placed and the test film was fixedly attached onto the cup mouth. At that time, the film should not come in contact with water. The test material thus obtained was then placed in a chamber maintained at 23° C. and 50% relative humidity as prescribed in ASTM and weight loss of the material was checked from time to time. The moisture permeability was determined by using the following formula each day.

$$M.V.P.(g/m^2 \cdot 24\ hrs.) = \frac{\text{weight loss (g) in 24 hrs.}}{\text{cup inner surface area } (m^2)\ (0.002826)}$$

Average M.V.P. in 7 days test period was shown in Table 1.

TABLE 1

| Ex. | Base emulsion type | Base emulsion diameter (μ) | Base emulsion amount (part) | non-film particles type | non-film particles diameter (μ) | non-film particles amount (part) | Particle diameter ratio | Compounding ratio | PVC | Moisture permeability (g/m² · 24 hrs) |
|---|---|---|---|---|---|---|---|---|---|---|
| 1 | AcEM-1 | 0.5 | 40 | PE-1 | 0.04 | 5 | 12.5/1 | 89/11 | 17.6 | 250 |
| 2 | AcEM-2 | 0.3 | 40 | PE-2 | 0.06 | 10 | 5/1 | 80/20 | 25.3 | 400 |
| 3 | AcEM-3 | 0.2 | 40 | SiO-1 | 0.03 | 7 | 6.7/1 | 85/15 | 14.0 | 120 |
| 4 | AcEM-4 | 2 | 40 | PE-2 | 0.06 | 5 | 33.3/1 | 89/11 | 17.6 | 300 |
| 5 | AcEM-5 | 0.5 | 40 | PE-1 | 0.04 | 20 | 12.5/1 | 67/33 | 37.1 | 630 |
| 6 | AcEM-6 | 0.1 | 35 | PE-2 | 0.06 | 20 | 1.7/1 | 64/36 | 40.2 | 370 |
| 7 | AcEM-4 | 2 | 40 | PE-3 | 0.15 | 5 | 13.3/1 | 89/11 | 17.6 | 420 |

What is claimed is:

1. An aqueous coating composition for concrete structures consisting essentially of (A) an acrylic resin emulsion, wherein resin particles contained therein have an average particle diameter of 0.05 to 5 microns and wherein the resin has film-forming properties, in which (B) hydrophilic microparticles are uniformly dispersed, the said microparticles being of a non-film-forming acrylic resin, being resistive to morphological change under temperature of use conditions, containing 0.05m mol/g or more of hydrophilic monomers selected from the group consisting of a (poly)oxyethylene group containing macromer represented by the formula:

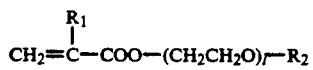

in which $R_1$ is hydrogen or a methyl group; $R_2$ is a lower alkyl or phenyl group; and l is an integer of 1 to 50, and end hydrophilic group containing macromer represented by the formula:

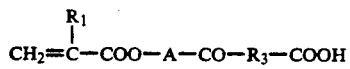

in which $R_1$ is a hydrogen or methyl group; $R_3$ is a substituted or unsubstituted aliphatic hydrocarbon having 2 to 10 carbon atoms, an alicyclic hydrocarbon having 6 to 7 carbon atoms or an aromatic hydrocarbon having 6 carbon atoms; A is a repeating unit of

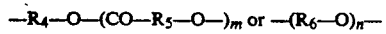

in which $R_4$ is ethylene or propylene; $R_5$ is a substituted or unsubstituted alkylene having 2 to 7 carbon atoms; $R_6$ is a substituted or unsubstituted alkylene having 2 to 5 carbon atoms; m is an integer of 1 to 10; and n is an integer of 2 to 50, and an end hydrophilic group containing macromer represented by the formula:

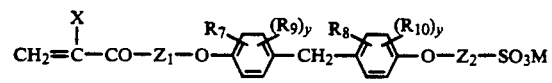

in which $R_7$ and $R_8$ are the same or different groups and each represents a hydrogen atom or an alkyl group having 1 to 25 carbon atoms; $R_9$ and $R_{10}$ are the same or different groups and each represents an alkyl group having 1 to 25 carbon atoms, a benzyl group or a styrene group; Y is O or an integer of 1 to 2; $Z^1$ and $Z^2$ are the same or different (poly)alkyleneoxy groups represented by the formula:

wherein $A^1$, $A^2$, $A^3$ ... $A^{n'}$ are the same or different groups and each represents an ethylene or a propylene group and wherein n' is not less than 1; M is an alkaline metal, an alkaline earth metal, an ammonium or an amine cation; and X is a hydrogen atom or a methyl group, and having an average diameter of 0.01 to 3 microns, the solid weight ratio of said (A)/(B) being 99/1 to 50/50.

2. A composition according to claim 1, wherein the ratio of the average diameter of the resin particles of the acrylic resin emulsion (A) and the average diameter of the hydrophilic microparticles (B) is 50/49 to 50/1.

3. An aqueous coating composition for concrete structures consisting essentially of (A) an acrylic resin emulsion, in which resin particles contained therein have an average particle diameter of 0.05 to 5 microns and wherein the resin has film-forming properties, in which (B) hydrophilic microparticles and (C) pigments are uniformly dispersed, the said microparticles being of a non-film-forming acrylic resin, being resistive to morphological change under temperature of use conditions, containing 0.05 m mol/g or more of hydrophilic monomers selected from the group consisting of a(poly)oxyethylene group containing macromer represented by the formula:

in which $R_1$ is a hydrogen or a methyl group; $R_2$ is a lower alkyl or phenyl group; l is an integer of 1 to 50, an end hydrophilic group containing macromer represented by the formula:

in which $R_1$ is a hydrogen or methyl group; $R_3$ is a substituted or unsubstituted aliphatic hydrocarbon having 2 to 10 carbon atoms, an alicyclic hydrocarbon having 6 to 7 carbon atoms or an aromatic hydrocarbon having 6 carbon atoms; A is a repeating unit of

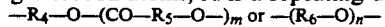

$R_4$ is an ethylene or propylene; $R_5$ is a substituted or unsubstituted alkylene having 2 to 7 carbon atoms, $R_6$ is a substituted or unsubstituted alkylene having 2 to 5 carbon atoms, m is an integer of 1 to 10, and n is an integer of 2 to 50, and an end hydrophilic group containing macromer represented by the formula:

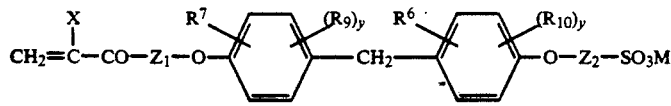

in which $R_7$ and $R_8$ are the same or different groups and each represents a hydrogen atom or an alkyl group having 1 to 25 carbon atoms; $R_9$ and $R_{10}$ are the same or different groups and each represents an alkyl group having 1 to 25 carbon atoms, a benzyl group or a styrene group; y is 0 or an integer of 1 to 2; $Z^1$ and $Z^2$ are the same or different (poly)alkyleneoxy groups represented by the formula:

wherein $A^1, A^2, A^3$—... $A^{n'}$ are the same or different groups and each represents an ethylene or propylene group and wherein n' is not less than 1; M is an alkaline metal, an alkaline earth metal, an ammonium or an amine cation; and X is a hydrogen atom or a methyl group, and having an average diameter of 0.01 to 3 microns, the solid weight ratio of said (A)/(B) being 99/1 to 50/50, and the volume fraction of the total weight of said (B) and (C) in the total volume of said (A), (B) and (C) being 50% or less.

4. A composition according to claim 3, wherein the ratio of the average diameter of the resin particles of the acrylic resin emulsion (A) and the average diameter of the hydrophilic microparticles (B) is 50/49 to 50/1.

* * * * *